Patented Aug. 16, 1949

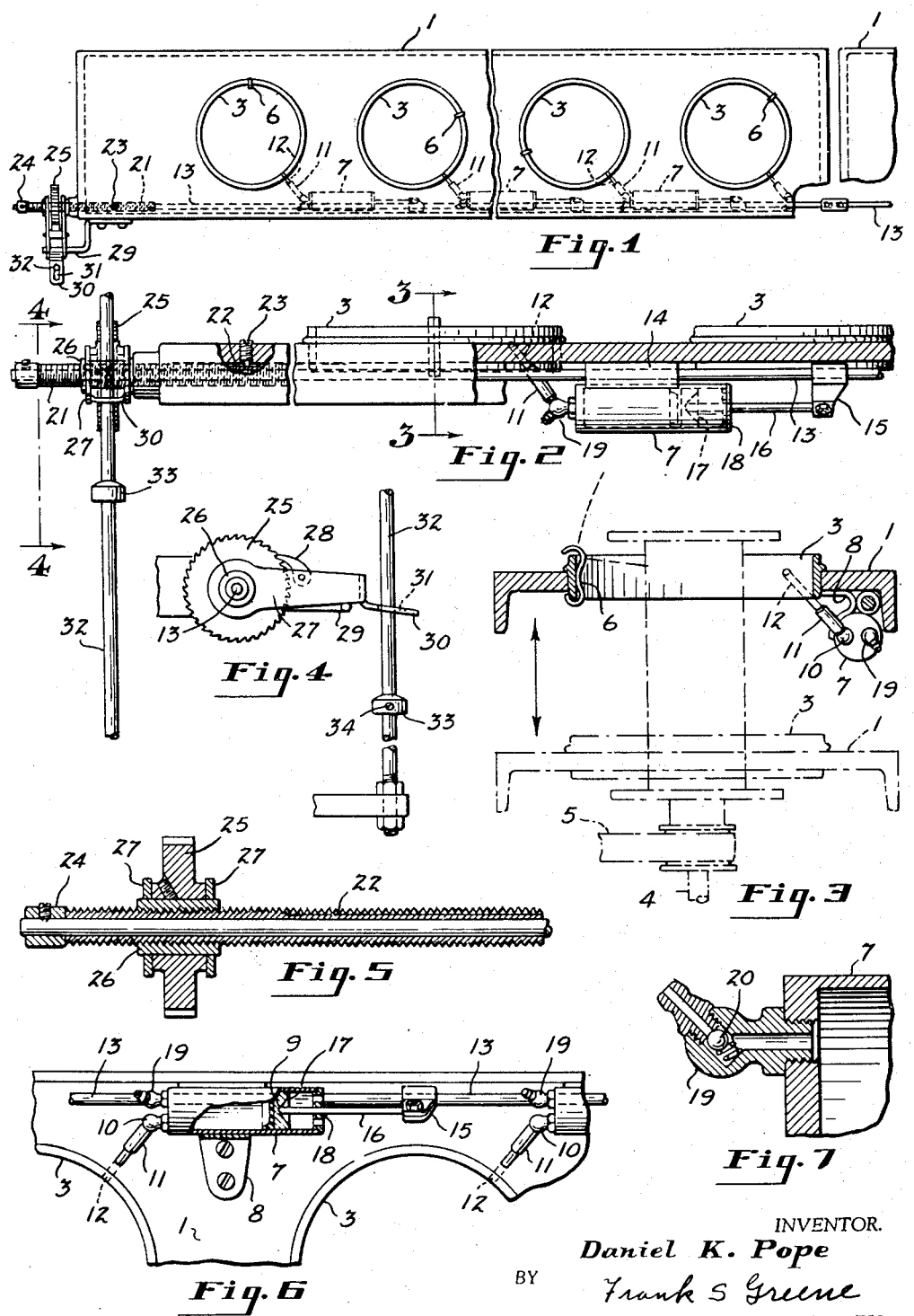

2,479,401

UNITED STATES PATENT OFFICE 2,479,401

TWISTER RING LUBRICATING DEVICE

Daniel K. Pope, Wapakoneta, Ohio, assignor to Texlube Corporation, Cleveland, Ohio, a corporation of Ohio Application December 30, 1943, Serial No. 516,236

10 Claims. (Cl. 57—120)

This invention relates to twisting machines of the type in which the spindles are centered within traveler rings that reciprocate relative to the spindle and more particularly to a method of and apparatus for lubricating such traveler rings.

In machines of the character referred to it is very desirable that the tension on the tread or cord be kept as uniform as possible. In order to make the tension more uniform and to avoid high frictional resistance to the movement of the traveler on the ring which would cause heating of the cord and excessive tension on the cord, it is desirable to lubricate the traveler rings. While several methods of supplying lubricant to the rings have been proposed, the most common practice is to stop the machine at intervals and rub grease by hand upon the inner faces of the rings.

The main objects of the present invention are to economize in the use of lubricant, to avoid contamination of the thread or cord with lubricant thrown from the rings, and to provide a lubricating device that will uniformly lubricate the ring during operation of the machine so that uniform tension will be maintained upon the thread or cord being twisted and wound upon the bobbin carried by the spindle and generation of excessive heat in the rings and travelers is prevented.

More specifically it is the object of the present invention to provide a method and apparatus for applying lubricant to the inner faces of the traveler rings which will continuously maintain a thin and uniform film of lubricant on the face of the ring so as to maintain a uniform and low coefficient of friction between the traveler and ring but which will not, at any time, deliver lubricant in a quantity sufficient to permit formation of droplets that may be thrown from the ring onto the cord or thread being twisted by the rapidly moving traveler.

A further object of the invention is to provide means by which minute measured quantites of a plastic lubricant, such as a high melting point grease, may be fed at uniform intervals to each traveler ring during operation of the machine.

It is also an object of the invention to provide a lubricant feed at which lubricant is forced into the ring by means of a plunger that is progressively advanced in timed relation to reciprocating movements of the ring and in which means are provided for automatically rendering the plunger operating means inoperative after the plunger has moved a predetermined distance.

Another object of the invention is to provide a lubricating feed device comprising a cylinder having a fitting at its outlet end through which lubricant may be forced into the cylinder to fill the same, the cylinder also having a plunger movable toward the outlet end and provided with an actuator which bears against the plunger to advance the same in the cylinder but which is adapted to be retracted independently of the plunger so that the return movement of the plunger in the cylinder will be caused by the pressure of grease introduced into the cylinder thereby preventing entry of air into the lubricating chamber.

With the above and other objects in view the invention may be said to comprise the method of and apparatus for lubricating traveler rings illustrated in the accompanying drawings hereinafter described and particularly set forth in the appended claims together with such variation and modification thereof as will be apparent to one skilled in the art to which the invention pertains.

Reference should be had to the accompanying drawings forming a part of this specification in which:

Fig. 1 is a top plan view of the ring rail of a twister frame to which the lubricating device of the present invention has been applied;

Fig. 2 is a front elevation of the ring rail, part of which is broken away to show one of the lubricating cylinders mounted on the under side thereof;

Fig. 3 is a vertical section on an enlarged scale taken on the line indicated at 3—3 in Fig. 2;

Fig. 4 is a fragmentary sectional view taken on the line indicated at 4—4 in Fig. 2 and showing the ratchet mechanism for operating the plunger operating screw in side elevation;

Fig. 5 is an axial section through the ratchet and screw;

Fig. 6 is a fragmentary bottom plan view of a ring rail showing the cylinders mounted on the under side thereof;

Fig. 7 shows one of the inlet fittings in section and on an enlarged scale.

In the accompanying drawings the invention is shown applied to a vertically reciprocating ring rail 1 which carries spaced traveler rings 3. As shown in Fig. 3 a spindle 4 is centered within each of the traveler rings and is adapted to be rapidly rotated by suitable means such as a belt 5.

During operation of the machine a thread or cord is simultaneously twisted and wound upon a bobbin on each of the spindles, each cord passing through a traveler 6 mounted to slide on a ring 3. The traveler 6 slides rapidly around the ring 3 while the spindle is being rotated and the ring rail 1 is slowly reciprocated vertically to cause the cord or thread to wind evenly upon a bobbin carried by the spindle 4.

The present invention provides a means for forcing a minute measured quantity of lubricant through the rings 3 to the inner faces thereof at intervals timed with respect to the reciprocating movements of the ring rail 1. Various lubricants may be employed but it is preferred that the lubricant be in the form of a plastic solid, such as a high melting point grease, which is adapted to be spread by the travelers in a thin film on the inner faces of the rings but which will not be reduced to low viscosity by the heat generated by the friction and will not flow except when pressure is applied thereto.

The present invention provides a means for regulating the delivery of lubricant to the ring in such manner as to maintain a uniform thin film of lubricant between the inner faces of the rings and the portions of the travelers that bear against said inner faces. The lubricant for each ring is delivered thereto from a reservoir in the form of a cylinder 7 mounted on the under side of the rail 1 adjacent the ring. Each cylinder 7 is rigidly attached to a bracket 8 secured to the under face of the ring rail and each cylinder is provided with a plunger 9 for expelling lubricant therefrom. Each cylinder 7 is provided with an outlet fitting 10 which is connected by a short tube 11 to a passage 12 extending through the adjacent ring 3 to the inner face thereof. During operation of the machine, each plunger 9 is intermittently advanced a predetermined distance in its cylinder at regular intervals of time to force minute measured quantities of lubricant through the fitting 10 and passage 12 to the interior of the adjacent traveler ring.

The invention contemplates the use of a suitable mechanism for simultaneously actuating the plungers 9. As herein shown a common actuator for the plungers in the form of a longitudinally movable rod 13 is provided. The actuating rod 13 is slidably mounted in axially alined sleeves 14, each parallel to one of the cylinders 7 and attached to the cylinder and its supporting bracket 8. The rod 13 has arms 15 fixed thereto, one adjacent each cylinder, to each of which is attached a plunger rod 16 that bears against the outer face of a plunger 9. The plunger rods 16 have no attachment to the plungers and may be simultaneously retracted with the rod 13 independently of the plungers 9. To center the rods 16 with respect to the plungers 9, the plungers may be provided with conical recesses 17 in their outer faces and each cylinder may have a spider 18 for guiding a rod 16. By reason of the fact that the plunger rods 16 are unattached, the plungers 9 are moved toward the open ends of the cylinders 7 only when lubricant is introduced into the cylinder at the outlet end. This insures the complete filling of the cylinder with lubricant and prevents entrapment of air with the lubricant. The lubricant could be introduced through the outlet opening into the cylinder but for convenience it is preferred that a separate fitting 19 be provided through which lubricant may be forced into the cylinder by suitable means such as a grease gun, the fitting 19 being provided with a suitable check valve 20 to prevent discharge of lubricant from the cylinder through the fitting 19 by plunger applied pressure. At one end thereof the rod 13 extends through a screw sleeve 21 that is slidably mounted in the rail 1. The screw 21 is provided with a longitudinal groove 22 to receive a pin 23 that is mounted in a fixed position in the rail 1. The pin 23 engaging in the groove 22 holds the screw against rotation but permits the screw to have endwise movement. One end of the screw sleeve 21 bears against a collar 24 fixed to the rod 13 and a ratchet wheel 25 is detachably secured to a nut 26 that is screwed upon the externally threaded screw sleeve 21.

A U-shaped pawl arm 27 straddles the ratchet wheel 24 and is pivoted upon the nut 26. The arm 27 carries a pawl 28 that engages with the ratchet 25. The arm 27 is normally held by gravity in a substantially horizontal position in which it rests upon a supporting arm 29 attached to the rail 1. At its outer end the arm 27 has a projecting flange 30 provided with an opening 31 that receives a fixed vertical post 32. The post 32 has an abutment collar 33 adjustably secured thereto by means of a setscrew 34.

During the reciprocating movement of the ring rail 1, the pawl arm 27 moves downwardly with the rail and engages with the fixed abutment 33. After the arm 27 engages the abutment 33 continued downward movement of the rail causes the arm 27 to swing upwardly and impart a turning movement to the ratchet 25. The amount of angular movement imparted to the ratchet upon each reciprocation of the ring rail may be regulated by vertically adjusting the abutment collar 33. The pawl 28 imparts a turning movement to ratchet 25 and nut 26 in the direction to press the nut against the adjacent ring rail 1 and to move the screw 21 outwardly against the collar 24. Upon each reciprocation of the ring rail the ratchet 25 and nut 26 are turned through a predetermined small angle on the screw 21 imparting a minute linear movement to the screw 21 and the rod 13. Each of the plunger actuating rods 16 moves with the rod 13 so that a minute measured forward movement is imparted to each plunger during each reciprocation of the ring rail. This movement of the plungers causes a minute measured quantity of lubricant to be forced from each cylinder into its tube 11 and a like quantity to flow from each passage 12 to the inner face of each traveler ring where it is picked up by the traveler and spread over the inner face of the ring. By adjusting the ratchet actuator the minute measured quantities of grease fed to the inner faces of the rings, may be so regulated that the amount of lubricant used is not in excess of that required for reducing friction and danger of contaminating the thread or cord being twisted with lubricant is eliminated. Each cylinder 7 may be provided with a supply of grease sufficient to last the machine for a considerable period of time and a uniform feed of the lubricant to the rings is insured by reason of the fact that the lubricant is in an unbroken column and its flow is always in the same direction so that regularity of feed is not impaired by air entrapped in the lubricant. Since the entire space within each cylinder, tube 11 and passage 12 between the plunger and the inner face of the adjacent ring 3 is filled with lubricant, and sealed against entry of air, reduction in air pressure at the outlet of the passage 12 due to passage of the traveler at high speed does not appreciably affect the flow of lubricant which is controlled solely by the movement of the plunger 9.

In order to prevent damage to the actuating mechanism the groove 22 of the screw sleeve 21 extends to the inner end of the sleeve which is so disposed with respect to the pin 23 that the screw 21 moves to a position clear of the pin when the plungers 9 have reached a position close to the outlet ends of the cylinders 7. The ratchet and screw plunger actuating mechanism is thereby automatically rendered inoperative after the plungers 9 have moved a predetermined distance in the cylinders 7.

The ring rails of a twister frame are ordinarily formed in sections in order to avoid stresses that would be set up in a long rail by the action of a series of spaced actuating cranks which might be slightly out of line. The actuating rod 13 may extend the full length of the sectional ring rail and may be formed in sections connected at the adjoining ends of the rail sections by means of suitable flexible couplings 35. The couplings 35 allow adjoining rod sections to have slight lateral play so that binding of the rod in the guides is avoided.

From the foregoing it will be apparent that the present invention provides a means of supplying lubricant to the rings at a uniform rate regulated as to prevent heating and to maintain a uniform tension, that the lubricating device will operate for long periods of time without attention and that the device may be readily installed upon a ring rail without any alteration in such rails or in the rings except the provision of the passages to the inner faces of the rings.

It is to be understood that variations and modifications of the specific device herein shown and described for purposes of illustration, may be made without departing from the spirit of the invention.

What I claim is:

1. The combination with a traveler ring of a twisting machine in which a spindle is centered within the ring and the ring and spindle have relative axial reciprocating movements, of a lubricant reservoir mounted in fixed position with respect to said ring and having a single outlet, a plunger movably mounted in said reservoir, a conduit receiving all of the lubricant expelled from the outlet of said reservoir and leading to the interior face of said ring, and means operable intermittently in timed relation to said reciprocating movements for imparting slight advancing movements of a predetermined extent to said plunger to intermittently force minute measured quantities of the lubricant from said reservoir to the interior face of said ring.

2. The combination with a traveler ring of a twisting machine in which a spindle is centered within the ring and the ring and spindle have relative axial reciprocating movements, of a lubricant reservoir mounted in fixed position with respect to said ring and having a single outlet, a plunger movably mounted in said reservoir, lubricant conducting means connecting said outlet to the interior face of said ring and receiving all of the lubricant forced from said reservoir by said plunger, a screw for advancing said plunger, and means operating timed relation to said reciprocating movements for imparting to the screw successive turning movements through a predetermined angle and in the same direction.

3. The combination with a traveler ring of a twisting machine in which a spindle is centered within the ring and the ring and spindle have relative axial reciprocating movements, of a lubricant reservoir mounted in fixed position with respect to said ring and having an outlet, a plunger movably mounted in said reservoir, a single conduit connected to said outlet for conducting lubricant from said reservoir to the interior face of said ring, a screw mounted for endwise movement alongside said reservoir and parallel to the line of travel of said plunger, means detachably connecting said screw to the said plunger to move the plunger toward said outlet upon movement of the screw in one direction, and means including a ratchet and pawl for imparting predetermined endwise movements to the screw in timed relation to said reciprocating movements.

4. In a twisting machine in which the spindles are each centered in a traveler ring and in which a series of rings are mounted in a rail that reciprocates axially with respect to the spindles, a lubricant reservoir mounted on said rail adjacent each ring, means including a passage through each ring for conducting lubricant from said reservoirs to the interior faces of the rings, a movable plunger in each reservoir for forcing lubricant from the reservoir to the ring, a member mounted for endwise movement on said rail, means operating in timed relation to the reciprocating movements of the rail for intermittently and progressively advancing said member, and means connecting said plungers to said member for movement therewith.

5. In a twisting machine in which the spindles are each centered in a traveler ring and in which a series of rings are mounted in a rail that reciprocates axially with respect to the spindles, a lubricant containing cylinder mounted upon the rail adjacent each ring, each cylinder having an outlet and a plunger for forcing lubricant through the outlet, means for conducting lubricant from each of said outlets to the adjacent ring, a member mounted for linear movement on said rail, means operable during reciprocating movements of the rail for imparting predetermined movements in one direction to said member, and means operated by said member for simultaneously advancing said plungers in said cylinders to force lubricant from said cylinders to said rings.

6. The combination with the vertically reciprocating ring rail of a twisting machine, of a lubricant container in the form of a cylinder mounted on said rail adjacent each ring, said cylinders being positioned with their axes disposed longitudinally of said rail, a rod parallel with said cylinders and mounted for endwise movement on said rail, a plunger in each cylinder, means connecting each plunger to said rod for movement therewith, means for conducting lubricant from each cylinder to an adjacent ring, and means for advancing said rod a predetermined distance upon each reciprocation of said rail.

7. The combination with the vertically reciprocating ring rail of a twisting machine, of a lubricant container in the form of a cylinder mounted on said rail adjacent each ring, each cylinder having an outlet at one end and a plunger for expelling lubricant through said outlet, said cylinders being disposed with their axes extending longitudinally of the rail, a rod parallel with said cylinders mounted for endwise movement on said rail, means for detachably connecting each plunger to said rod for movement therewith, means for intermittently and progressively moving said rod and plungers toward the outlet ends of said cylinders, and means for conducting lubricant from said cylinders to said rings.

8. The combination with the vertically reciprocating ring rail of a twisting machine, of a lubricant container in the form of a cylinder adjacent each ring on said rail, each cylinder having an outlet and a plunger for forcing lubricant through the outlet, means for conducting lubricant from each cylinder outlet to a ring, a screw on said rail, a ratchet mechanism operated in timed relation to the reciprocation of said rail for progressively advancing said screw, means connecting said plungers to said screw for operation thereby, and means operable upon a predetermined movement of the screw for disconnecting said ratchet mechanism from the screw.

9. In a twisting machine having a series of vertically reciprocating ring rails arranged end to end, of lubricant containers in the form of cylinders positioned adjacent the rings on said rails, said cylinders being disposed with their axes extending longitudinally of said rails, said cylinder having similarly positioned outlets and each having a plunger, a rod on each rail extending lengthwise thereof and movable in an endwise direction, flexible couplings connecting said rods end to end, means connecting the plungers to said rods for movement therewith, and means associated with one of said rails for imparting a predetermined endwise movement to said rods during each reciprocating movement of the rail.

10. The combination with a machine of the character described having a power driven member, of a lubricant cylinder mounted on said machine and having an outlet at one end and a plunger movable toward said outlet end to expel lubricant from the cylinder, an actuator for said plunger reciprocable axially of the cylinder, said actuator being operated by said power driven member and engageable with said plunger when moved toward the outlet end of the cylinder to press the plunger toward said outlet end of the cylinder, said actuator being retractible independently of said plunger whereby the said plunger may be moved away from said outlet end by the pressure of lubricant introduced into the cylinder at the outlet end.

DANIEL K. POPE.

REFERENCES CITED

The following references are of record in the file of this patent:

UNITED STATES PATENTS

| Number | Name | Date |
|---|---|---|
| 845,510 | Boyd | Feb. 26, 1907 |
| 1,318,932 | Strom | Oct. 14, 1919 |
| 1,622,026 | Couchman | Mar. 27, 1927 |
| 1,622,027 | Couchman | Mar. 27, 1927 |
| 2,005,725 | Banfield et al. | June 25, 1935 |
| 2,014,113 | Morse | Sept. 10, 1935 |
| 2,233,460 | Stahl | Mar. 4, 1941 |